US010965968B2

(12) United States Patent
Kim et al.

(10) Patent No.: US 10,965,968 B2
(45) Date of Patent: Mar. 30, 2021

(54) SYSTEM FOR PROVIDING STEREOSCOPIC 3D 360 VIRTUAL REALITY SERVICE BASED ON HYBRID NETWORK

(71) Applicant: Fdn. for Res.&Bus., Seoul Nat. Univ. of Sci.&Tech., Seoul (KR)

(72) Inventors: Dong Ho Kim, Seoul (KR); Dongho You, Gyeonggi-do (KR)

(73) Assignee: FDN. FOR RES.&BUS., SEOUL NAT. UNIV. OF SCI.&TECH., Seoul (KR)

(*) Notice: Subject to any disclaimer, the term of this patent is extended or adjusted under 35 U.S.C. 154(b) by 211 days.

(21) Appl. No.: 16/199,435

(22) Filed: Nov. 26, 2018

(65) Prior Publication Data

US 2019/0335215 A1    Oct. 31, 2019

(30) Foreign Application Priority Data

Apr. 30, 2018  (KR) ........................ 10-2018-0050121

(51) Int. Cl.
| | |
|---|---|
| *H04N 21/2343* | (2011.01) |
| *H04N 5/232* | (2006.01) |
| *H04N 13/161* | (2018.01) |
| *H04N 21/2365* | (2011.01) |
| *H04N 7/01* | (2006.01) |
| *H04N 13/172* | (2018.01) |
| *H04N 13/194* | (2018.01) |

(52) U.S. Cl.
CPC ............ *H04N 21/234327* (2013.01); *H04N 5/23238* (2013.01); *H04N 7/0117* (2013.01); *H04N 13/161* (2018.05); *H04N 13/172* (2018.05); *H04N 13/194* (2018.05); *H04N 21/2365* (2013.01)

(58) Field of Classification Search
None
See application file for complete search history.

(56) References Cited

U.S. PATENT DOCUMENTS

| | | | |
|---|---|---|---|
| 10,609,356 B1 * | 3/2020 | Waggoner | H04N 19/597 |
| 2012/0075436 A1 * | 3/2012 | Chen | H04N 13/161 |
| | | | 348/51 |

(Continued)

FOREIGN PATENT DOCUMENTS

| | | |
|---|---|---|
| KR | 20160098974 | 8/2016 |
| KR | 101713492 | 3/2017 |

*Primary Examiner* — Ricky Chin
(74) *Attorney, Agent, or Firm* — HoustonHogle LLP

(57) ABSTRACT

The present invention relates to a system for providing a stereoscopic 3D 360-degree virtual reality (VR) service based on a hybrid network. According to a detailed embodiment of the present invention, standardizing and multiplexing based on an ATSC 3.0 protocol for a base layer stream, an enhancement layer stream, and a stereoscopic stream which are derived from a high resolution left eye image and a high resolution right eye image which are captured by 360-degree cameras may be performed by performing MPD signaling, and thus realistic media such as HD and UHD resolution 360-degree VR broadcast services, stereoscopic 3D 360-degree VR services, etc. may be provided. In addition, system complexity may be reduced by deriving a base layer stream, an enhancement layer stream, and a stereoscopic stream by using one encoder, and thus compression efficiency may be improved.

4 Claims, 3 Drawing Sheets

(56) References Cited

U.S. PATENT DOCUMENTS

| | | | | |
|---|---|---|---|---|
| 2013/0194505 A1* | 8/2013 | Pahalawatta | ......... | H04N 19/117 348/607 |
| 2014/0092978 A1* | 4/2014 | Bugdayci | ............... | H04N 19/30 375/240.16 |
| 2014/0341293 A1* | 11/2014 | Chen | .................... | H04N 13/161 375/240.16 |
| 2014/0355693 A1* | 12/2014 | Chen | .................... | H04N 13/161 375/240.26 |
| 2015/0103886 A1* | 4/2015 | He | ....................... | H04N 19/188 375/240.02 |
| 2016/0065976 A1* | 3/2016 | He | ....................... | H04N 19/176 375/240.12 |
| 2018/0027304 A1* | 1/2018 | Kim | .................... | H04N 19/597 725/116 |
| 2020/0228776 A1* | 7/2020 | Deshpande | .......... | H04N 19/597 |

* cited by examiner

```
01 <MPD>
02   <Period>
03     <!-- Adaptation Sets for Down-sampled Right QHD 360 Video Separated into 16 (4x4) Tiles -->
04     <AdaptationSet id="right_tile_1">
05       <SupplementalProperty schemeIdUri="urn:mpeg:dash:srd:2014" value="1,0,0,640,360,2560,1440" <!--1st Tile of Right Video-->
06       <Representation id="right_nHD_1" mimeType="video/mp4" width="640" height="360"...>
07         <BaseURL>right_nHD_1.mp4 </BaseURL>
08       </Representation>
09     </AdaptationSet>
10     <AdaptationSet id="right_tile_2">
11       <SupplementalProperty schemeIdUri="urn:mpeg:dash:srd:2014" value="1,640,0,640,360,2560,1440" <!--2nd Tile of Right Video-->
12       <Representation id="right_nHD_2" mimeType="video/mp4" width="640" height="360"...>
13         <BaseURL>right_nHd_2.mp4 </BaseURL>
14       </Representation>
15     </AdaptationSet>
16       :
17     <!-- Adaptation Sets for Left 8K 360 Video Separated into 16 (4x4) Tiles -->
18     <AdaptationSet id="left_tile_1">
19       <SupplementalProperty schemeIdUri="urn:mpeg:dash:srd:2014" value="2,0,0,1920,1080,7680,4320" <!--1st Tile of Left Video-->
20       <EssentialProperty value="right_tile_1" schemeIdUri="http://dashif.org/guidelines/dash-atsc-videoposition/"> <!--Stereoscopic Paring-->
21       <Representation id="left_FHD_1" mimeType="video/mp4" width="1920" height="1080" dependencyID="right_nHD_1">
22         <BaseURL>left_FHD_1.mp4 </BaseURL>        <!--Dependency Mapping-->
23       </Representation>
24     </AdaptationSet>
25     <AdaptationSet id="left_tile_2">
26       <SupplementalProperty schemeIdUri="urn:mpeg:dash:srd:2014" value="2,1920,0,1920,1080,7680,4320" <!-- For 2nd Tile of Left Video-->
27       <EssentialProperty value="right_tile_2" schemeIdUri="http://dashif.org/guidelines/dash-atsc-videoposition/"> <!--Stereoscopic Paring-->
28       <Representation id="left_FHD_2" mimeType="video/mp4" width="1920" height="1080" dependencyID="right_nHD_2">
29         <BaseURL>left_FHD_2.mp4 </BaseURL>        <!--Dependency Mapping-->
30       </Representation>
31     </AdaptationSet>
32       :
33   </Period>
34 </MPD>
```

Base layer of SHVC: lines 03–16
Enhancement layer of SHVC (for 3D): lines 17–32

FIG. 4

SYSTEM FOR PROVIDING STEREOSCOPIC 3D 360 VIRTUAL REALITY SERVICE BASED ON HYBRID NETWORK

CROSS REFERENCE TO RELATED APPLICATION

The present application claims priority to Korean Patent Application No. 10-2018-005012, filed Apr. 30, 2018, the entire contents of which is incorporated herein for all purposes by this reference.

BACKGROUND OF THE INVENTION

Field of the Invention

The present invention relates generally to a system for providing a 3D stereoscopic 360-degree virtual reality (VR) service based on a hybrid network. More particularly, the present invention relates to a method of providing a 3D 360-degree VR broadcast service based on an ATSC 3.0 protocol.

Description of the Related Art

With the recent increase in IP-based requirements, the world's first standardization of ATSC 3.0, an IP-based broadcast system, has been completed. One of the ultimate goals of ATSC 3.0 is to ensure compatibility with existing fixed TVs and individual mobile devices, and to enable services for both users by using one transmission method.

A transmission method used in ATSC 3.0 is classified into two types which are MPEG Media Transport Protocol (MMPT) and Real-Time Object delivery over Unidirectional Transport (ROUTE). In 2017, broadcasting an ATSC 3.0 broadcast system experiment using ROUTE method has been successfully performed.

Recently, as VR devices have become more popular, requirements for realistic media such as 360-degree VR image are also increasing. Currently, such contents are provided to users on the basis of image sharing sites, and are used in various fields such as education, navigation, and games. Many scholars expect that such 360-degree VR image will greatly affect the broadcast industry in the future, and expect that an existing broadcast paradigm will be completely changed.

However, in a recently completed ATSC 3.0 broadcast protocol, stereoscopic 3D 360-degree VR image transmission is not considered.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to provide a system and method of providing a stereoscopic 3D 360-degree VR service based on a hybrid network, the system and method being capable of reducing complexity by using an MPD signaling configuration of one encoder, and thus maximizing compression efficiency.

In addition, the present invention is intended to provide a system and method of providing a stereoscopic 3D 360-degree VR service based on a hybrid network, the system and method being capable of providing to viewers realistic HD 360-degree VR services, UHD 360-degree VR services, and stereoscopic 3D UHD 360-degree VR services.

The object of the present invention is not limited to the aforesaid, but might be extended to other cases. Other objects and advantages of the present invention not described herein will be understood by the following description, and become more apparent from the embodiments of the present invention. Also, it can be easily understood that the objects and advantages of the present invention can be realized by the units and combinations thereof recited in the claims.

In order to achieve the above object, according to one aspect of the present invention, there is provided a system for providing a stereoscopic 3D 360-degree virtual reality (VR) service based on a hybrid network, the system including: a image obtaining unit obtaining a high resolution left eye image and a high resolution right eye image, respectively by using 360-degree cameras; a preprocessing unit performing tiling for the obtained left eye image and the right eye image to a predetermined size, respectively; a downsampling unit performing downsampling for the tiled right eye image to a predetermined resolution; an encoder: outputting a base layer stream and an enhancement layer stream by performing encoding for the downsampled left eye image, and the right eye image, respectively; and performing upsampling for the base layer stream to a high resolution, and outputting the upsampled base layer stream, the base layer stream, and the enhancement layer stream; and a broadcast server performing standardizing and multiplexing for at least one of the upsampled base layer stream, the base layer stream, and the enhancement layer stream according to a broadcast network standard regulation, and transmitting the same.

Preferably, the encoder may include: a base layer stream encoding processing unit outputting the base layer stream by encoding data of the tiled right eye image; an enhancement layer stream encoding processing unit outputting an enhancement layer stream of data of the tiled left eye image on the basis of the base layer stream; an upsampling unit performing upsampling for the downsampled base layer stream to a predetermined resolution; a stereoscopic stream encoding processing unit outputting the stereoscopic stream by performing encoding based on the upsampled base layer stream and the enhancement layer stream; and a transport processing unit generating MPD information of the base layer stream and the enhancement layer stream, and delivering the same to the broadcast server.

Preferably, the MPD information may include: tiling information configured with (spatial relationship description (SRD, and representing a viewport and a position between the tiles of the captured left eye image and the right eye image; stereoscopic pair information representing a stereoscopic pair ID assigned to the left eye image and the right eye image; and dependency information representing a base layer stream ID that is dependent on each enhancement layer stream.

Preferably, the SRD may be a component performing encoding and decoding independently.

According to another aspect, the present invention includes: a image obtaining unit obtaining a high resolution left eye image and a high resolution right eye image, respectively by using 360-degree cameras; a preprocessing unit performing tiling for the obtained left eye image and the right eye image to a predetermined size, respectively; a downsampling unit performing downsampling for the tiled right eye image to a low resolution; an encoder encoding the downsampled right eye image, and the left eye image; and a broadcast server performing standardizing and multiplexing for at least one of the upsampled base layer stream, the base layer stream, and the enhancement layer stream according to a broadcast network standard regulation, and transmitting the same, where the encoder includes: a base layer stream encoding processing unit outputting a base layer stream by encoding a tiled right eye image; an enhancement layer stream encoding processing unit outputting an enhancement layer stream of a tiled left eye image; an upsampling unit performing upsampling for a downsampled base layer stream to a predetermined resolution; a stereoscopic stream encoding processing unit outputting a stereoscopic stream on the basis of the upsampled base layer stream, and the enhancement layer stream; and a transport processing unit: generating MPD information including tiling information describing information of the base layer stream and the enhancement layer stream for decoding the stereoscopic stream, stereoscopic pair information, and dependency information between the base layer and the enhancement layer; and delivering the same to a broadcast server.

According to the present invention configured as above, standardizing and multiplexing based on an ATSC 3.0 protocol for a base layer stream, an enhancement layer stream, and a stereoscopic stream which are derived from high resolution left eye image and right eye image captured by 360-degree cameras can be performed by performing MPD signaling, and thus realistic media such as HD and UHD resolution 360-degree VR broadcast services, stereoscopic 3D 360-degree VR services, etc. can be provided.

According to the present invention, system complexity can be reduced by deriving a base layer stream, an enhancement layer stream, and a stereoscopic stream by using one encoder, and thus compression efficiency can be improved.

BRIEF DESCRIPTION OF THE DRAWINGS

The above and other objects, features and other advantages of the present invention will be more clearly understood from the following detailed description when taken in conjunction with the accompanying drawings, in which:

FIG. 4 is a view of an example of MPD signaling of a system according to an embodiment of the present invention.

DETAILED DESCRIPTION OF THE INVENTION

Figure 1:
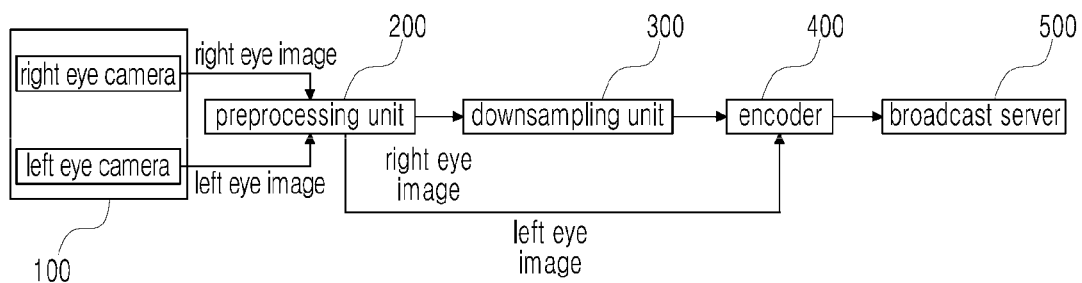
FIG. 1 is a view of a configuration diagram of a system according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. In addition, in order to clearly explain the present invention in the drawings, parts not related to the description are omitted, and similar parts are denoted by the same reference numerals throughout the specification.

Throughout the specification, unless explicitly described to the contrary, the word "comprise" and variations such as "comprises" or "comprising" will be understood to imply the inclusion of stated elements but not the exclusion of any other elements.

A transport stream applied to a broadcast network of an embodiment of the present invention may be real-time object delivery over unidirectional transport (ROUTE) or MPEG media transport protocol (MMTP). ROUTE and MMTP represent the standard of broadcasting network transport stream multiplexing which is currently conducted in ATSC 3.0. In addition, a transport stream transmitted to the Internet network conforms to the MPEG-DASH (dynamic adaptive streaming over HTTP) standard.

The present invention is configured to: perform tiling for a left eye image and a right eye image respectively captured by 360-degree cameras in a high resolution according to a service request mode; perform downsampling for one image selected between the left eye image and the right eye image for which tiling is performed; derive a base layer stream, an enhancement layer stream, and a stereoscopic stream by encoding the downsampled image and the other one original image other than the downsampled image; perform MPD signaling for the base layer stream, the enhancement layer stream, and the stereoscopic stream which are derived for providing a stereoscopic 3D 360-degree VR broadcast service; and transmit the derived base layer stream, the enhancement layer stream, and the stereoscopic stream, and MPD information through a broadcast network (ROUTE) or the Internet or both by standardizing and multiplexing the same based on an ATSC 3.0 protocol. Herein, a hybrid network is a network transmitting a image stream through a broadcast network or the Internet or both.

FIG. 1 is a view of a configuration diagram of a system for providing a stereoscopic 3D 360-degree VR broadcast service based on a hybrid network according to an embodiment of the present invention. A system S according to an embodiment of the present invention includes a image obtaining unit 100, a preprocessing unit 200, a downsampling unit 300, an encoder 400, and a broadcast server 500.

The image obtaining unit 100 outputs a left eye image and a right eye image, which are respectively captured by two cameras supporting a predetermined resolution (for example, an 8K resolution). Each image captured by each camera may be used as a UHD (ultra high definition) image or HD image as it is, or a partial area of each image may be applied to a stereoscopic UHD image in a 360-degree VR service.

Accordingly, the preprocessing unit 200 performs tiling for each of the obtained left eye image and the right eye image according to a service requirement, and delivers to the downsampling unit 300 data of the right eye image selected between the eye image and the right eye image for which tiling is performed.

Figure 2:
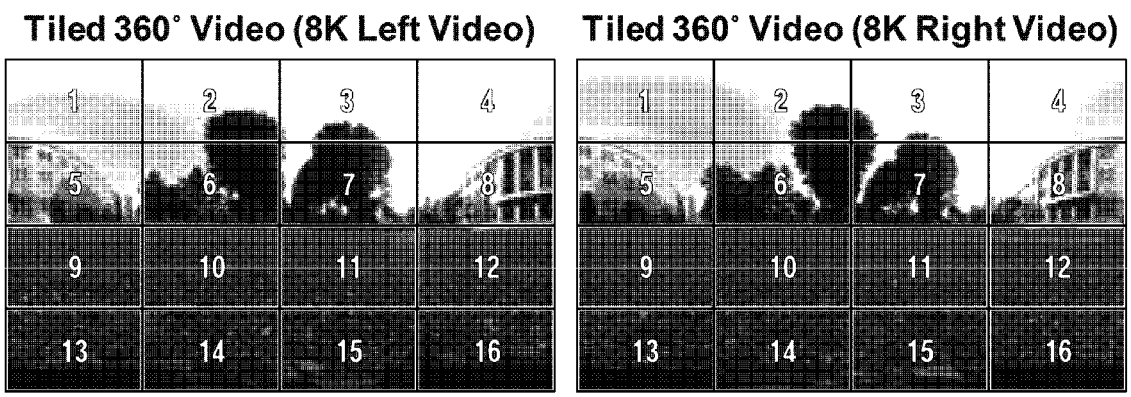
FIG. 2 is a view of an example of a tiled image of a system according to an embodiment of the present invention.

FIG. 2 is a view of an example state where tiling is performed by the preprocessing unit 200 shown in FIG. 1, and referring to FIG. 2, a left eye image and a right eye image are tiled in the same size and the same number.

The downsampling unit 300 performs downsampling for the selected right eye image to have a predetermined resolution (for example, a quad high definition (QHD) resolution lower than a UHD resolution), and outputs the right eye image having a resolution lower than the obtained resolution. The downsampled right eye image, and a high resolution left eye image for which downsampling is not performed are delivered to the encoder 400.

The encoder 400 encodes the downsampled right eye image and the high resolution left eye image, and outputs the same in a stream form. Herein, the encoder 400 is provided with scalable high efficiency video codec (SHVC).

Accordingly, the present invention may reduce complexity of the system S by using one encoder and decoder for proving an UHD 360-degree VR broadcast service, a HD 360-degree VR broadcast service, and a stereoscopic UHD 360-degree VR broadcast service, and thus compression efficiency may be improved.

Figure 3:
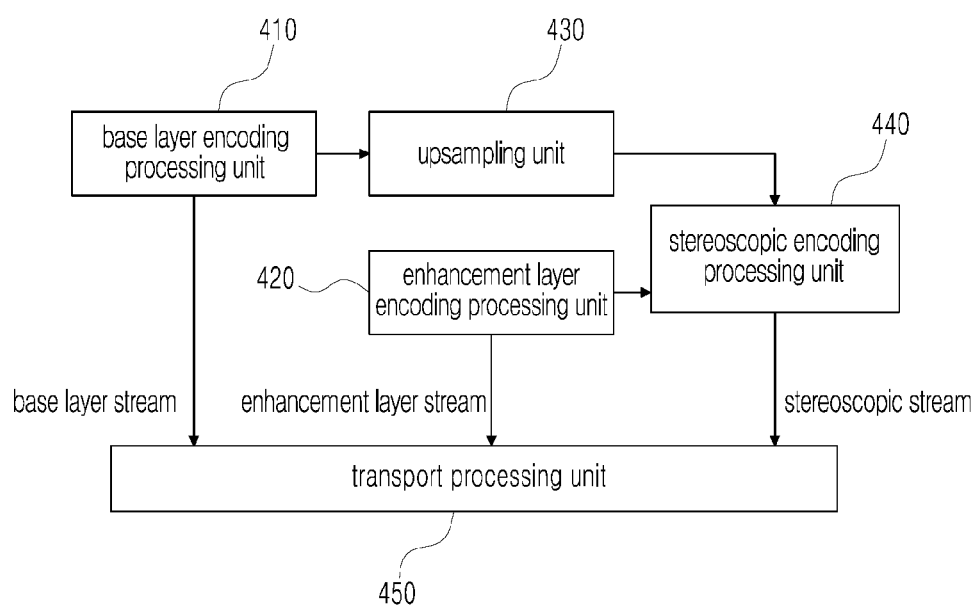
FIG. 3 is a view of a configuration diagram of an encoder according to an embodiment of the present invention.

FIG. 3 is a detailed configuration diagram of the encoder 400 shown in FIG. 1, and referring to FIG. 3, the encoder 400 includes a base layer encoding processing unit 410, an enhancement layer encoding processing unit 420, an upsampling unit 430, a stereoscopic encoding processing unit 440, and a transport processing unit 450.

The encoder 400 configured as above: outputs a base layer stream and an enhancement layer stream by encoding the downsampled right eye image and the high resolution left eye image; and outputs a stereoscopic stream on the basis of the output base layer stream and the enhancement layer stream. A series of processes for forming a base layer stream and an enhancement layer stream, and processing to a high quality stereoscopic stream by receiving the base layer stream and the enhancement layer stream according to an embodiment of the present invention has been filed before by the present applicant.

Herein, a base layer stream is configured with a transport stream of a right eye image, an enhancement layer stream is configured with a transport stream of a left eye image for providing high resolution (for example, an 8K resolution) quality for a user selection or view of interest (VoI), and a stereoscopic stream is configured with a transport stream of a 3D image by applying a predetermined standard regulation to the left eye image and the right eye image.

In other words, the base layer encoding processing unit 410 performs downsampling for the tiled 360-degree right eye image to a QHD resolution, and forms to a base layer stream by decoding the same based on SHVC. In addition, the enhancement layer encoding processing unit 420 forms the tiled 360-degree left eye image to an enhancement layer stream by encoding the same by referencing base layer information for each VoI. Herein, an enhancement layer stream based on a VoI selected by a user has a minimum resolution of 8K for each VoI. Accordingly, an enhancement layer stream for each VoI is output where a base layer stream including a downsampled right eye image, and a left eye image of an original image are included.

Meanwhile, the upsampling unit 430 receives the base layer stream and performs upsampling for the same to a high resolution (for example, an 8K resolution), and outputs the upsampled base layer stream.

Subsequently, the stereoscopic encoding processing unit 440 outputs a 3D image stream by using the upsampled base layer stream and the enhancement layer stream.

Subsequently, the transport processing unit 450 performs media presentation description (MPD) signaling for the base layer stream and the enhancement layer stream when performing decoding, and generates MPD information.

FIG. 4 is a view of an example of MPD signaling of the transport processing unit 450 shown in FIG. 2. Referring to FIG. 4, MPD information includes tiling information, stereoscopic pair information, and dependent information between a base layer and an enhancement layer.

In other words, tiling information includes spatial relationship description (SPR) representing a viewport and a position between a captured left eye image and a right eye image, and SRD of each tile is a component possibly independently encoded and decoded, and is represented by using an adaptation set (AdaptationSet). For example, SRD is specified by a schemedUri and a value by using SupplementalProperty within each adaptation set. Accordingly, when performing decoding, whether or not to be a tile, and if so, a position and a viewport of the corresponding tile are identified by schemedUri and a value of a component within a corresponding adaptive set.

For example, when schemedUri for SRD is "urn:m.peg:dash:srd:2014", and a value is represented as "source_id, object_x, object_width, object_hight, total_width, total_high, spatial_set_id", a tile ID of a corresponding tile, a left upper horizontal position and a vertical position, a width and a height of the corresponding tile, a width and a height of an original image, and a tile for which grouping is performed may be possibly determined. In other words, when tiling is performed to 16 by taking into account of an original image of 8K, a resolution of one tile becomes 1920×1080. Accordingly, a value of SupplementalProperty of the first tile of a left side image becomes (2, 0, 0, 1920, 1080, 7680, 4320) as shown in a 19-th line. A value of SupplementalProperty of the second tile becomes (2, 1920, 0, 1920, 1080, 7680, 4320).

Meanwhile, for a stereoscopic UHD 360-degree VR broadcast service, MPD information includes a stereoscopic pair ID of left eye and right eye images. In other words, a stereoscopic pair ID between a left eye image (tile) and a right eye image (tile), that is, adaptation set data of MPD information, is represented by EssentialProperty. Herein, a value of EssentialProperty has to be identical to an adaptation set ID within a right eye image constituting a stereoscopic pair.

Meanwhile, MPD information further includes dependency information between a base layer and an enhancement layer for performing transmission based on a hybrid network. For example, when decoding an enhancement layer stream, a dependency ID representing which of base layer streams are dependent by the enhancement layer stream is indicated by Representation of the adaptation set.

In other words, when performing decoding, a dependency ID is a signal for determining which Representation has to be dependent by corresponding Representation, and thus a dependency ID of an enhancement layer has to be matched with a value of Representation of a corresponding base layer stream.

The broadcast server 500 having received the above base layer stream, the enhancement layer stream, the stereoscopic stream, and the MPD information performs standardizing and multiplexing for the base layer stream, the enhancement layer stream, the stereoscopic stream, and the MPD information according to an ATSC 3.0 broadcast platform (ROUTE) and an Internet platform (DASH), and transmits the same. Accordingly, realistic media such as UHD 360-degree VR broadcast services, HD 360-degree VR broadcast services, and stereoscopic UHD 360-degree VR broadcast services, etc. are provided to viewers.

For example, in an embodiment of the present invention, a base layer stream, an enhancement layer stream, and a stereoscopic stream which are applied to a broadcast network may be multiplexed by using ROUTE. Such a broadcast network transport stream multiplexing standard conforms to ROUTE that is standardized in ATSC 3.0, and a transport stream transmitted through an Internet network conforms to the DASH standard.

For the same, the broadcast server 500 generates a transport stream by performing multiplexing for a base layer stream and an enhancement layer stream by using ROUTE/DASH, and the transport stream is transmitted to each channel or PLP so as to provide an UHD 360-degree VR broadcast service, an HD 360-degree VR broadcast service, and a stereoscopic 360-degree VR broadcast service. Accordingly, viewers are provided with a low quality HD 360-degree VR broadcast service through his or her mobile terminal, a high quality UHD 360-degree VR broadcast service through a fixed terminal, and a stereoscopic UHD 360-degree VR broadcast service through a 3D terminal.

In other words, since a stereoscopic stream and MPD information are additionally transmitted through a broadcast network, viewers are provided with, in addition to an UHD broadcast service, realistic media and a 3D image service through various mobile terminals.

Accordingly, the present invention may perform standardizing and multiplexing, by performing MPD signaling, based on an ATSC 3.0 protocol for a base layer stream, an enhancement layer stream, and a stereoscopic stream which are derived from high resolution left eye image and right eye image which are captured by 360-degree cameras, and thus provide realistic media such as HD and UHD resolution 360-degree VR broadcast services, stereoscopic 3D 360-degree VR services, etc.

In addition, the present invention may reduce system complexity by deriving a base layer stream, an enhancement layer stream, and a stereoscopic stream by using one encoder, and thus compression efficiency may be improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A system for providing a stereoscopic 3D 360-degree virtual reality (VR) service based on a hybrid network, the system comprising:
 a image obtaining unit obtaining a high resolution left eye image and a high resolution right eye image, respectively by using 360-degree cameras;
 a preprocessing unit performing tiling for the obtained left eye image and the right eye image to a predetermined size, respectively;
 a downsampling unit performing downsampling for the tiled right eye image to a predetermined resolution;
 an encoder: outputting a base layer stream and an enhancement layer stream by performing encoding for the downsampled right eye image, and the tiled left eye image, respectively; and performing upsampling for the base layer stream to a high resolution, and outputting the upsampled base layer stream, the base layer stream, and the enhancement layer stream; and
 a broadcast server performing standardizing and multiplexing for at least one of the upsampled base layer stream, the base layer stream, and the enhancement layer stream according to a broadcast network standard regulation, and transmitting the same,
 wherein the encoder generates MPD (media presentation description) information of the base layer stream and the enhancement layer stream, and wherein the MPD information includes:
 tiling information configured with SRD (spatial relationship description), and representing a viewport and a position between the tiles of the captured left eye image and the right eye image;
 stereoscopic pair information representing a stereoscopic pair ID assigned to the left eye image and the right eye image; and
 dependency information representing a base layer stream ID that is dependent on each enhancement layer stream.

2. The system of claim 1, wherein the encoder includes:
 a base layer stream encoding processing unit outputting the base layer stream by encoding data of the tiled right eye image;
 an enhancement layer stream encoding processing unit outputting an enhancement layer stream of data of the tiled left eye image on the basis of the base layer stream;
 an upsampling unit performing upsampling for the downsampled base layer stream to a predetermined resolution;
 a stereoscopic stream encoding processing unit outputting the stereoscopic stream by performing encoding based on the upsampled base layer stream and the enhancement layer stream; and
 a transport processing unit generating the MPD information of the base layer stream and the enhancement layer stream, and delivering the same to the broadcast server.

3. The system of claim 1, wherein the SRD is a component performing encoding and decoding independently.

4. An encoder of a system providing a stereoscopic 3D 360-degree virtual reality service based on a hybrid network, the encoder comprising:
 a base layer stream encoding processing unit outputting a base layer stream by encoding a tiled right eye image;
 an enhancement layer stream encoding processing unit outputting an enhancement layer stream of a tiled left eye image;
 an upsampling unit performing upsampling for a downsampled base layer stream to a predetermined resolution;
 a stereoscopic stream encoding processing unit outputting a stereoscopic stream on the basis of the upsampled base layer stream, and the enhancement layer stream; and
 a transport processing unit: generating MPD information including tiling information describing information of the base layer stream and the enhancement layer stream for decoding the stereoscopic stream, stereoscopic pair information, and dependency information between the base layer and the enhancement layer; and delivering the same to a broadcast server,
 wherein the tiling information is configured with SRD (spatial relationship description), and represents a viewport and a position between the tiles of the captured left eye image and the right eye image,
 wherein the stereoscopic pair information represents a stereoscopic pair ID assigned to the left eye image and the right eye image, and
 wherein the dependency information represents a base layer stream ID that is dependent on each enhancement layer stream.

* * * * *